United States Patent
Hsu

(10) Patent No.: US 9,719,545 B2
(45) Date of Patent: Aug. 1, 2017

(54) SCREW

(71) Applicant: Kuo-Tai Hsu, Tainan (TW)

(72) Inventor: Kuo-Tai Hsu, Tainan (TW)

( * ) Notice: Subject to any disclaimer, the term of this patent is extended or adjusted under 35 U.S.C. 154(b) by 51 days.

(21) Appl. No.: 14/821,836

(22) Filed: Aug. 10, 2015

(65) Prior Publication Data

US 2017/0045075 A1 Feb. 16, 2017

(51) Int. Cl.
*F16B 25/10* (2006.01)
*F16B 25/00* (2006.01)

(52) U.S. Cl.
CPC ...... *F16B 25/0052* (2013.01); *F16B 25/0015* (2013.01); *F16B 25/103* (2013.01)

(58) Field of Classification Search
CPC ..... F16B 25/10; F16B 25/103; F16B 25/0052
USPC .......... 411/386, 321, 31, 387.1–387.81
See application file for complete search history.

(56) References Cited

U.S. PATENT DOCUMENTS

| | | | | | |
|---|---|---|---|---|---|
| 45,133 | A | * | 11/1864 | Bonwill | F16B 25/0015 411/421 |
| 877,131 | A | * | 1/1908 | Searelle | F16B 35/06 411/399 |
| 4,697,969 | A | * | 10/1987 | Sparkes | F16B 25/0015 411/387.7 |
| 5,895,187 | A | * | 4/1999 | Kuo-Tai | F16B 25/0068 411/311 |
| 6,056,491 | A | * | 5/2000 | Hsu | F16B 25/0015 411/311 |
| 6,328,516 | B1 | * | 12/2001 | Hettich | F16B 25/0015 411/311 |
| 7,862,279 | B2 | * | 1/2011 | Stiebitz | F16B 25/0015 411/387.1 |
| 8,480,342 | B2 | * | 7/2013 | Stiebitz | F16B 25/0015 411/386 |
| 2006/0285940 | A1 | * | 12/2006 | Walther | F16B 25/0026 411/421 |
| 2007/0286701 | A1 | * | 12/2007 | Hsu | F16B 25/0015 411/387.1 |
| 2009/0003966 | A1 | * | 1/2009 | Hsu | F16B 15/06 411/394 |
| 2013/0011214 | A1 | * | 1/2013 | Lin | F16B 25/0015 411/387.4 |

* cited by examiner

*Primary Examiner* — Flemming Saether
(74) *Attorney, Agent, or Firm* — Alan D. Kamrath; Kamrath IP Lawfirm, P.A.

(57) ABSTRACT

A screw includes a shank and a thread extending spirally around an outer circumference of the shank. The thread includes a plurality of thread convolutions, and a plurality of ribs provided between two adjacent thread convolutions of the thread. A helical groove is formed in the outer circumference of the shank and extends continuously across at least partial of the plurality of thread convolutions of the thread. The helical groove intersects partial of the plurality of ribs, and the helical groove has a width which is 1.5-2.5 times a width of the rib. The helical groove is used to accommodate residues which are generated when the screw is driven in articles to be assembled for speedily driving the screw without degradation of the binding capacity between the screw and the articles.

6 Claims, 7 Drawing Sheets

SCREW

BACKGROUND OF THE INVENTION

1. Field of the Invention

The present invention relates to a screw and, more particularly, to a screw with a spiral continual groove in which residues can be held.

2. Description of the Related Art

A large amount of wood or compound wooden materials mixed and compressed from plastic resin and wood chips are used to produce wooden articles for furniture, decoration and construction, and screws are often used in connecting wooden articles together. A conventional screw generally includes a shank and at least one thread formed on the shank, so that the screw can be screwed into the articles which need to be fastened or interlocked. Furthermore, in order to enhance the speed of screwing the screw into the articles to be fastened, a design with slots disposing in the shank or crests of the thread for collecting or receiving chips or residues is already proposed. More specifically, chips, wooden chips for example, are produced when the screw is screwed into the articles to be assembled, and the slots can be used for receiving the chips so that the chips will not obstruct the process of screwing the screw into the articles, allowing rapid insertion of the screw into the articles and preventing disintegration of the materials of the articles. However, chips or residues held in the slots in the shank or the crest are limited and accumulate in an upper section of a screw mostly, decelerate a process of the screw being driven in the article, and even inflate or break the article.

Taiwan Utility Model No. M373974 discloses a screw with chip removal flutes. The screw includes two symmetric spiral chip removal flutes formed on a periphery of a self-drilling portion for removing residues from the screw driven in a wood article. However, each chip removal flute which is wide and has more circles on a screw shank (even on the whole shank) allows threads and the article to occlude ineffectively, reducing binding capacity of the screw. Furthermore, the chip removal flutes decrease strength of the screw and make the screw driven in the article break easily.

BRIEF SUMMARY OF THE INVENTION

Thus, an objective of the present invention is to provide a screw to improve the aforementioned problems. The screw includes a continual helical groove in which residues are held, so that the screw is effective in removing residues and can be speedily driven in articles to be fastened. Furthermore, the continual helical groove does not reduce binding capacity between the screw and articles to be fastened.

To achieve this and other objectives, a screw of the present invention includes a shank and a thread. The shank includes an outer circumference, an insertion tip, and a head end spaced from the insertion tip along a longitudinal axis of the screw. The thread is helically formed on the outer circumference of the shank and includes a plurality of thread convolutions. A plurality of ribs is provided between two adjacent thread convolutions of the thread and spaced from one another on the outer circumference of the shank. A helical groove is formed in the outer circumference of the shank and extends continuously through at least partial of the plurality of thread convolutions of the thread. The helical groove intersects partial of the plurality of ribs and has a width which is 1.5-2.5 times greater than a width of each rib.

In a preferred form, the helical groove extends to an uppermost thread convolution of the thread from a nethermost thread convolution of the thread continuously. An inclined angle formed by the helical groove extending toward the head end relative to a horizontal axis perpendicular to the longitudinal axis is greater than an inclined angle formed by the thread extending toward the head end relative to the horizontal axis. An inclined angle formed by each of the plurality of ribs extending toward the head end relative to the horizontal axis is between 50 and 70 degrees, and the inclined angle formed by the helical groove relative to the horizontal axis is between 60 and 80 degrees. An upward extending direction of each of the plurality of ribs is opposite to an upward direction of the thread extending toward the head end. Each of the plurality of ribs has a height less than a thread height of each thread convolution. An upward spiral direction of the helical groove is the same as the upward direction of the thread extending toward the head end, and the helical groove has a depth which is 1.5-2.5 times greater than a height of each rib.

In another preferred form, the screw further includes a cutting groove provided in the insertion tip of the shank. The helical groove spirally extends from an upper end of the cutting groove to an uppermost thread convolution of the thread continuously.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

Figure 1:
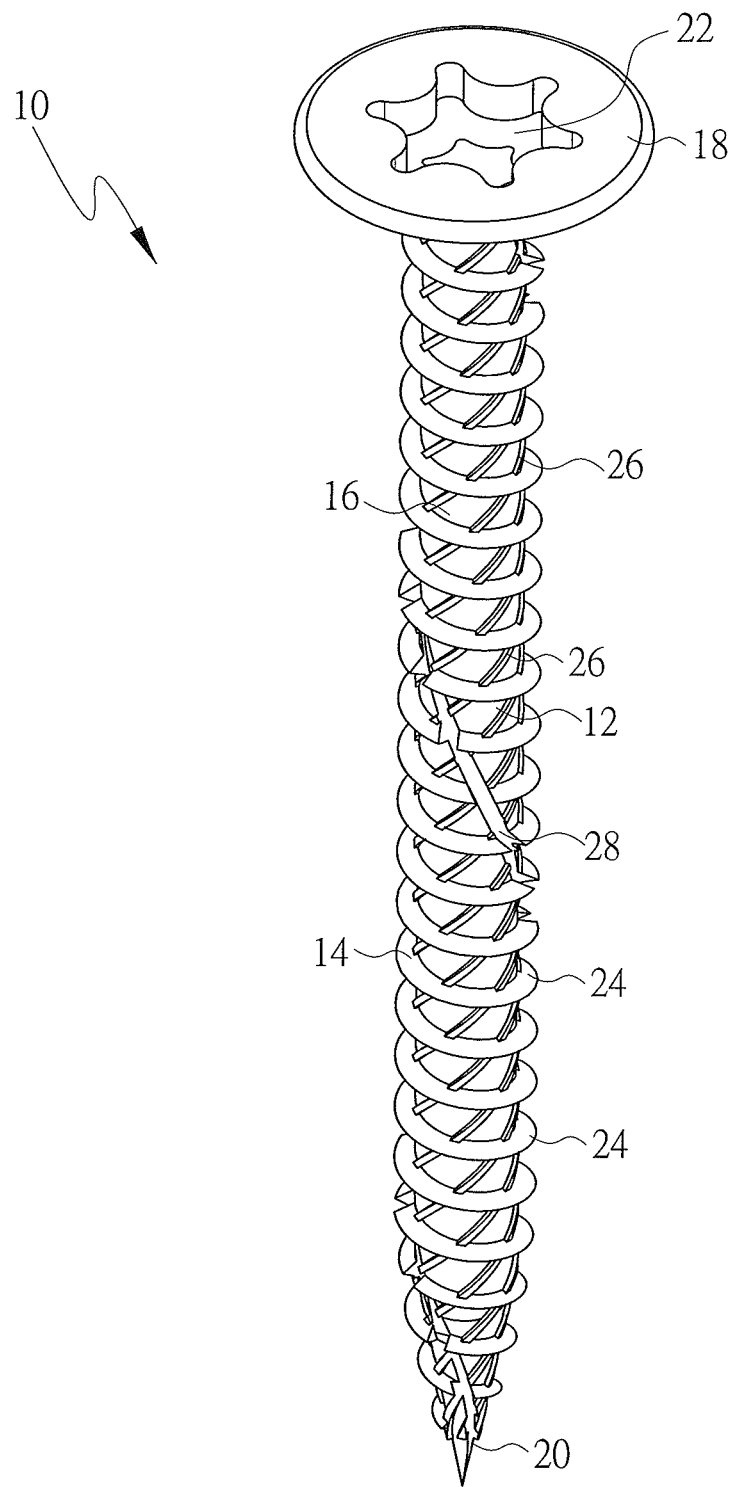
FIG. 1 is a perspective view of a screw in accordance with a first embodiment of the present invention.
Figure 2:
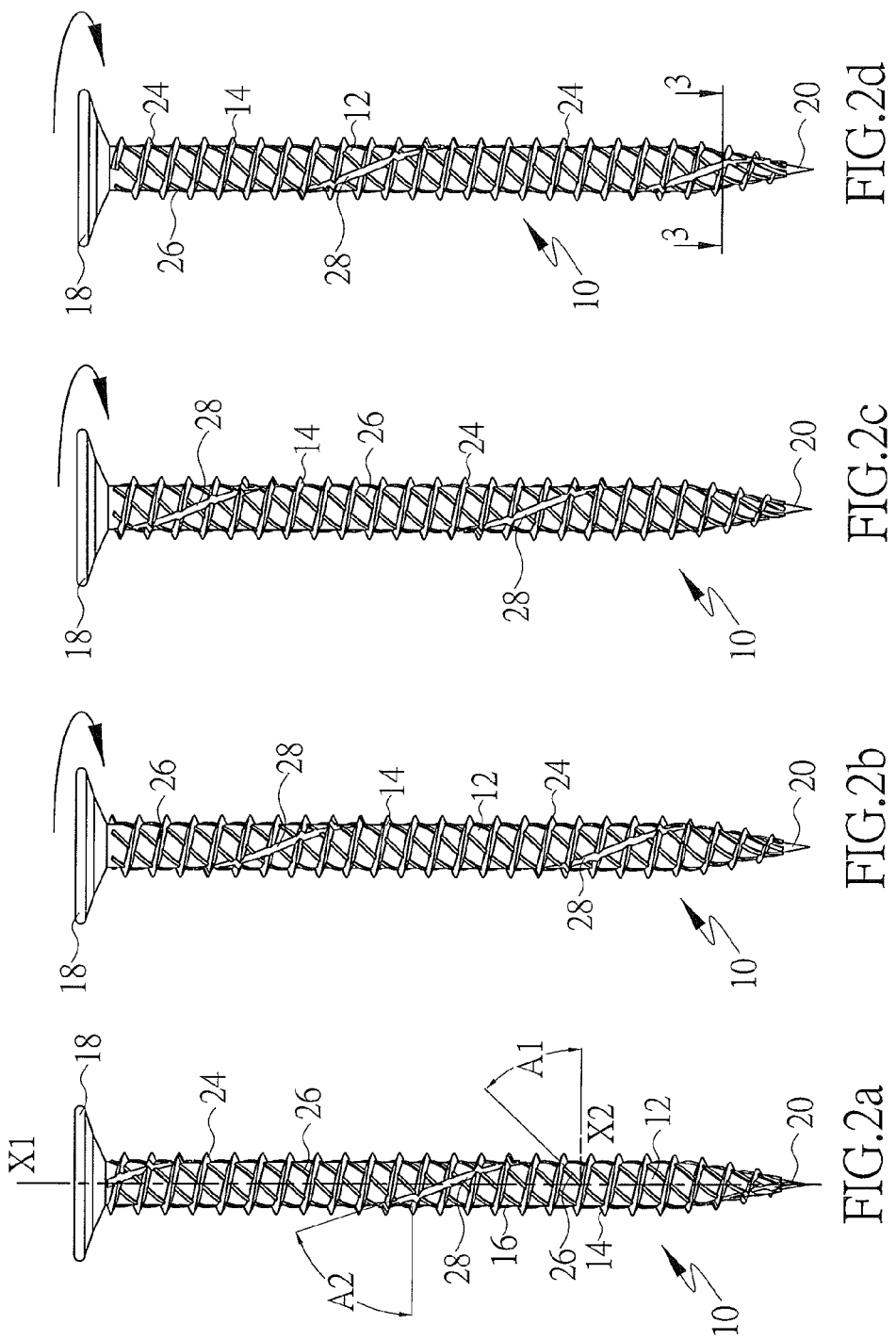
FIG. 2a is a front view of the screw of FIG. 1.
FIG. 2b is a plan view which illustrates the screw of FIG. 2a rotated 90 degrees.
FIG. 2c is a plan view which illustrates the screw of FIG. 2a rotated 180 degrees.
FIG. 2d is a plan view which illustrates the screw of FIG. 2a rotated 270 degrees.
Figure 3:
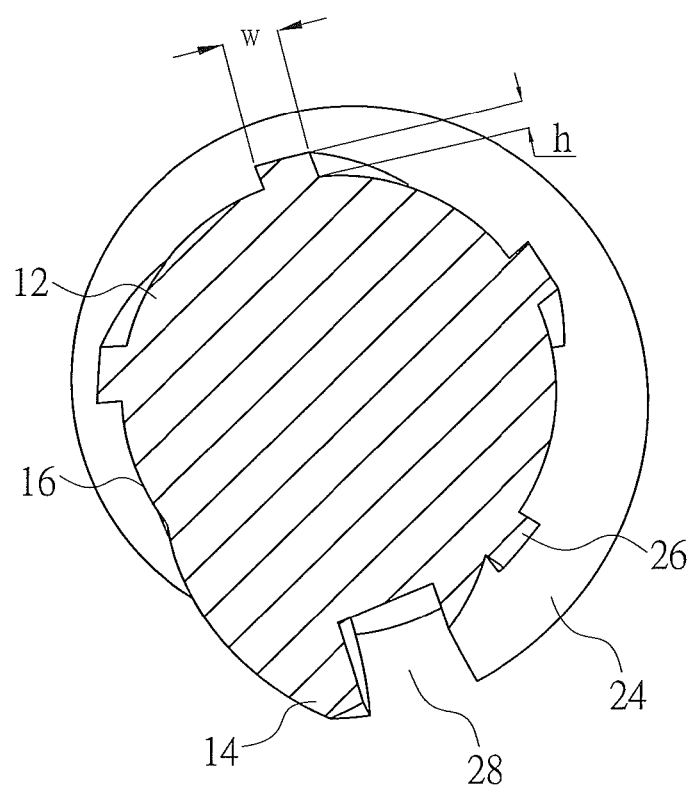
FIG. 3 is a sectional view taken along line 3-3 of FIG. 2d.

A screw according to the present invention is shown in FIGS. 1 through 4 of the drawings and generally designated 10. The screw 10 including a shank 12 and a continuous thread 14 formed on the shank 12. The shank 12 includes an outer circumference 16, an insertion tip 20, and a head end 18 spaced from the insertion tip 20 along a longitudinal axis (X1) of the screw 10. In this embodiment, the insertion tip 20 has a pointed end. The head end 18 has an outer diameter larger than a diameter of the shank 12 and includes a socket 22 formed in a top surface thereof for holding a screw driver (not shown in figures).

The thread 14 is helically formed on the outer circumference 16 of the shank 12 and extends from the insertion tip 20 towards the head end 18. In this embodiment, the thread 14 is disposed between the insertion tip 20 and the head end 18 and includes a plurality of thread convolutions 24. A roughly equaled pitch is defined between two adjacent thread convolutions 24, and between two adjacent thread convolutions 24 are designed a plurality of oblique ribs 26. The ribs 26 are parallel to and spaced from one another on the outer circumference 16 of the shank 12, and an upward extending direction of each rib 26 is opposite to an upward direction of the thread 14 extending toward the head end 18. In this embodiment, an inclined angle (A1) formed by each of the ribs 26 extending toward the head end 18 relative to a horizontal axis (X2) perpendicular to the longitudinal axis (X1) is between 50 and 70 degrees. Each of the ribs 26 has a rectangular cross section with a width (w) and a height (h) less than a thread height of each thread convolution 24.

The screw 10 further includes a continuous helical groove 28. The helical groove 28 is formed in the outer circumference 16 of the shank 12 and extends continuously through at least partial thread convolutions 24 of the thread 14. In this embodiment, the helical groove 28 extends to an uppermost thread convolution 24 of the thread 14 from a nethermost thread convolution 24 of the thread 14 continuously, as shown in FIG. 2a through FIG. 2d. An upward spiral direction of the helical groove 28 is the same as the upward extending direction of the thread 14, and an inclined angle (A2) formed by the helical groove 28 extending toward the head end 18 relative to the horizontal axis (X2) is greater than an inclined angle formed by the thread 14 extending toward the head end 18 relative to the horizontal axis (X2). In this embodiment, the helical groove 28 intersects partial ribs 26, and the inclined angle (A2) formed by the helical groove 28 relative to the horizontal axis (X2) is between 60 and 80 degrees. Furthermore, the helical groove 28 has a substantially U-shaped cross section with a depth and a width (FIG. 3), and each of which is 1.5-2.5 times greater than the height (h) and the width (w) of the rib 26, respectively. In a feasible embodiment, the helical groove 28 has a substantially V-shaped cross section.

Figure 4:
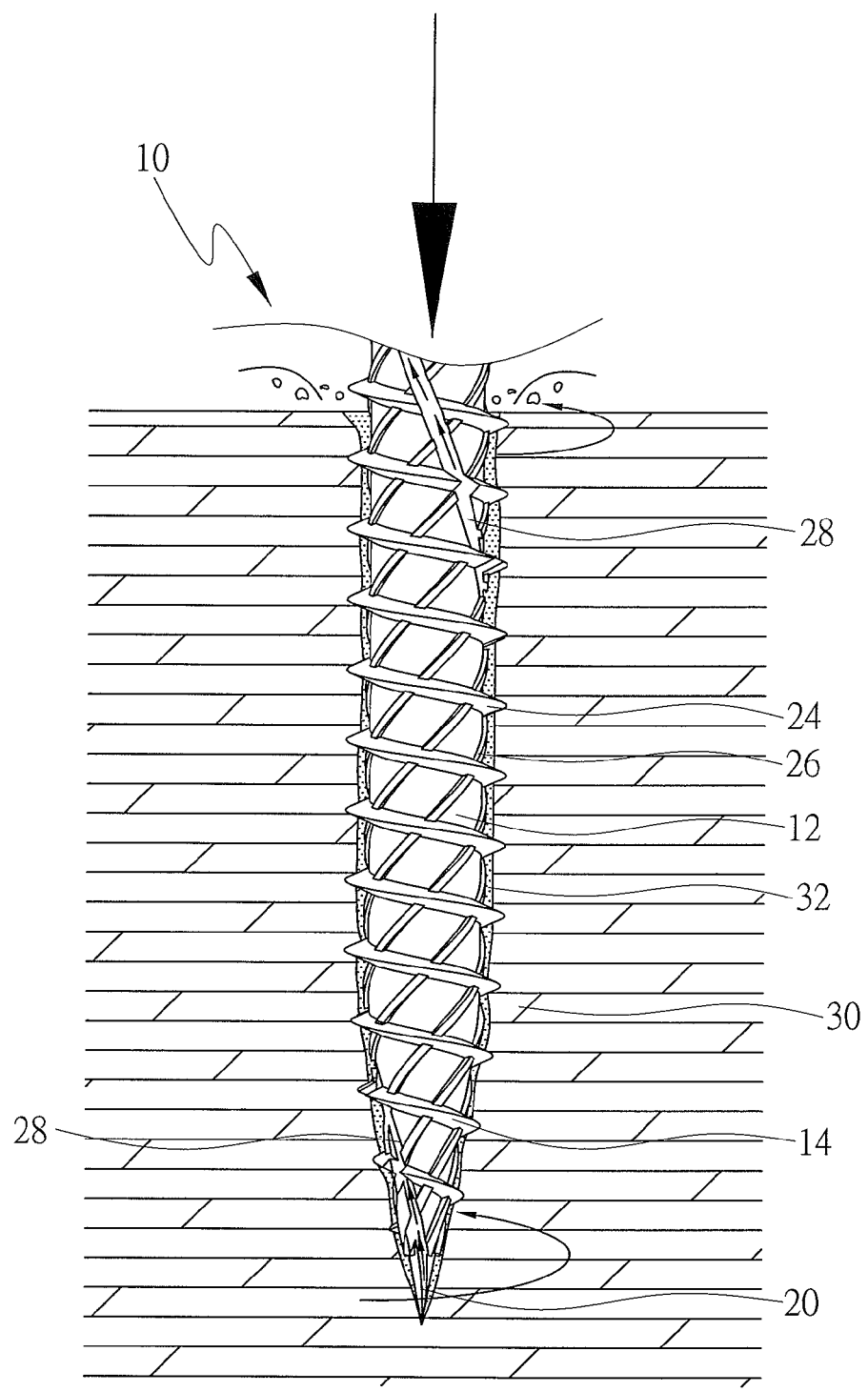
FIG. 4 is a schematic view which illustrates the screw of FIG. 1 driven in an article.

Referring to FIG. 4, when in use, the screw 10 is screwed into an article 30 (such as a wooden article) to be assembled with the insertion tip 20. When the insertion tip 20 of the screw 10 enters the article 30, chips or residues 32 are generated from the article 30 which is cut by the thread convolutions 24 of the thread 14. Meanwhile, the screw 10 on which less friction in a screw-in direction is applied can be driven in the article 30 speedily when the residues 32 are guided and removed upward by the oblique ribs 26. Moreover, the helical groove 28 accommodates the residues 32 squeezed out of the ribs 26, so that the residues 32 will not accumulate in the upper section of the screw 10. Thus, the screw 10 is coupled with the article 30 effortlessly and speedily with no cracks on the assembled article 30. In addition, the helical groove 28 does not degrade the binding capacity between the screw 10 and the article 30. Specifically, the inclined angle (A2) defined by the helical groove 28 relative to the horizontal axis (X2) is between 60 and 80 degrees, so that the helical groove 28 extends two circles merely on the outer circumference 16 of the shank 12. Furthermore, the helical groove 28 has a moderate width (1.5-2.5 times greater than the width of each rib 26) for a good effect of accommodating the residues 32 and without the structural strength of the shank 12 being adversely affected. Thus, the helical groove 28 does not interfere with occlusion between the thread convolutions 24 and the article 30 or with the binding capacity of the screw 10.

Figure 5:
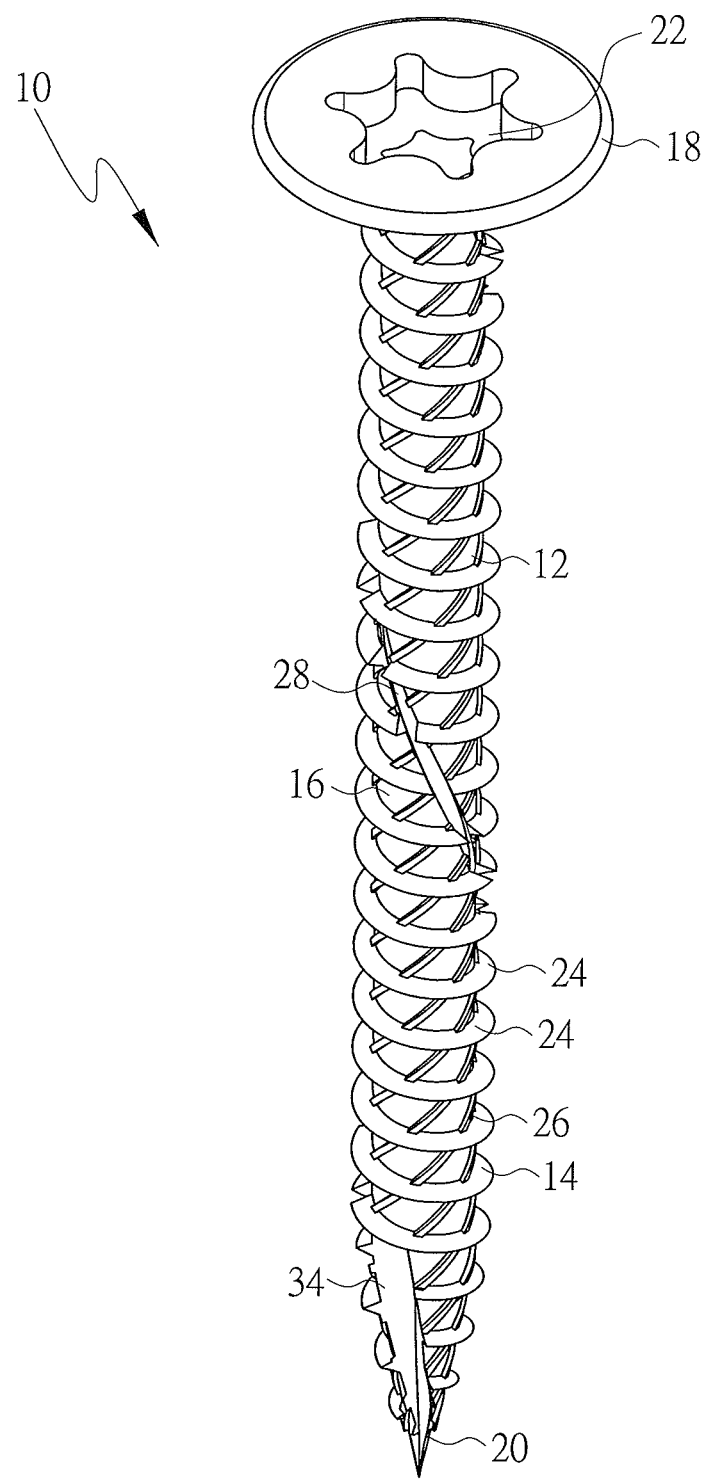
FIG. 5 is a perspective view of a screw in accordance with a second embodiment of the present invention.
Figure 6:
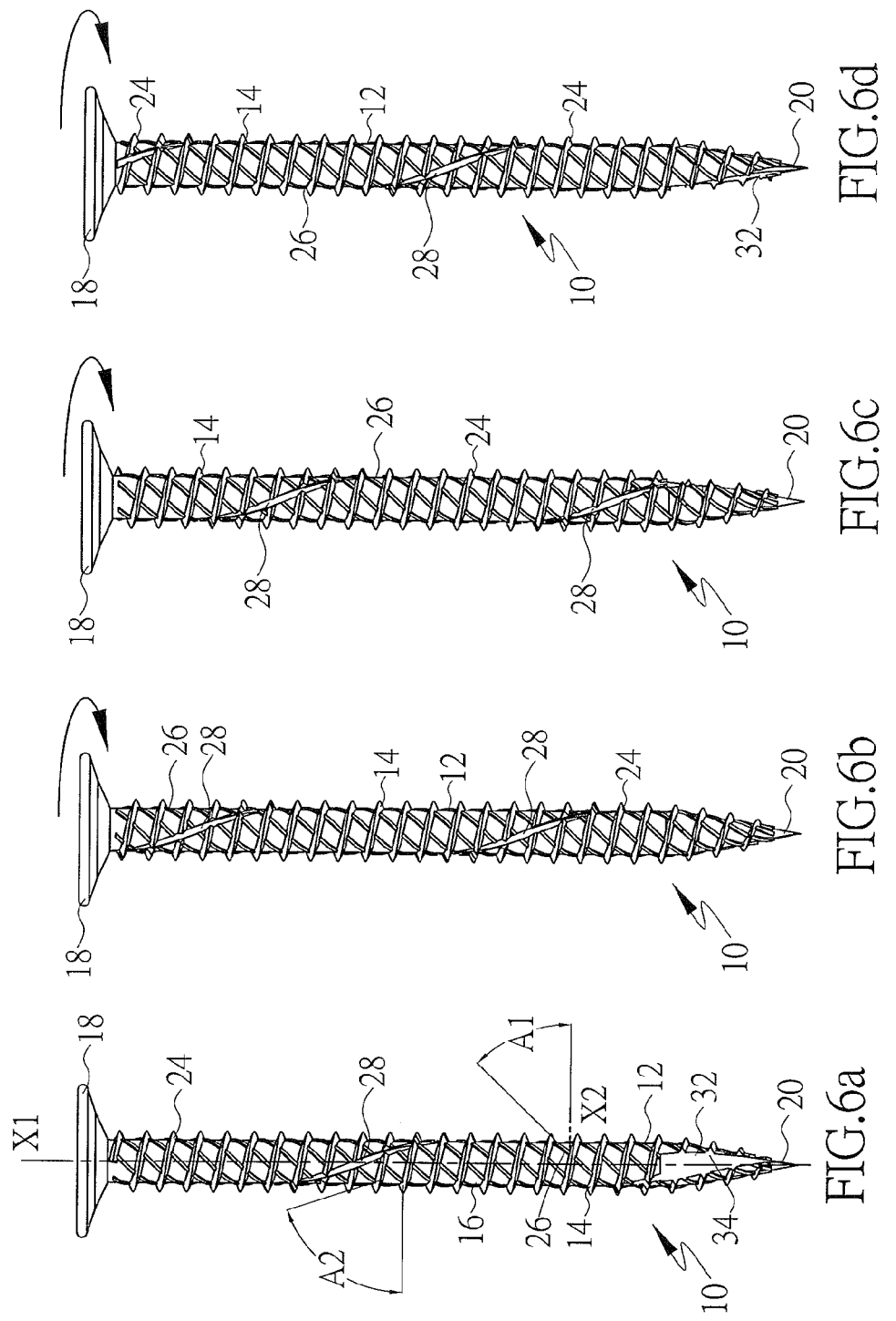
FIG. 6a is a front view of the screw of FIG. 5.
FIG. 6b is a plan view which illustrates the screw of FIG. 6a rotated 90 degrees.
FIG. 6c is a plan view which illustrates the screw of FIG. 6a rotated 180 degrees.
FIG. 6d is a plan view which illustrates the screw of FIG. 6a rotated 270 degrees.
Figure 7:
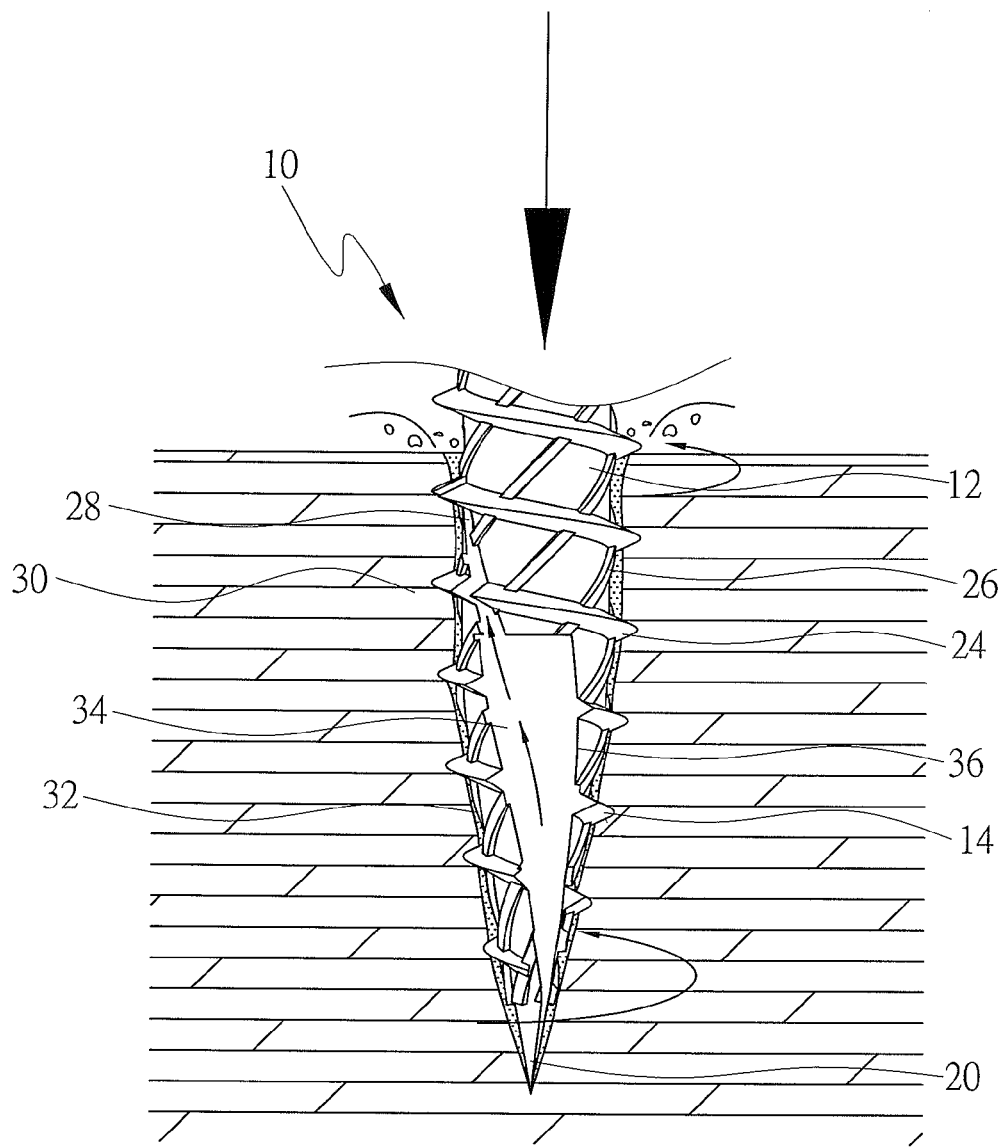
FIG. 7 is a schematic view which illustrates the screw of FIG. 5 driven in an article.

FIGS. 5 through 7 illustrate a screw 10 according to a second embodiment of the present invention. In this embodiment, a cutting groove 34 is provided in the insertion tip 20 of the shank 12 and extends a certain distance from the insertion tip 20 toward the head end 18 along the longitudinal axis (X1). The helical groove 28 encircling the outer circumference 16 of the shank 12 spirally extends from an upper end of the cutting groove 34 to the uppermost thread convolution 24 of the thread 14 continuously (see FIGS. 6a through 6d). Referring to FIG. 7, the residues 32 are generated from the article 30 which are cut by the thread convolutions 24 of the thread 14 as well as two side edges 36 of the cutting groove 34 when the insertion tip 20 of the screw 10 is screwed in the article 30 to be assembled. Meanwhile, the thread 14 is smoothly coupled with the article 30 when the residues 32 are held in the cutting groove 34. Furthermore, the residues 32 held in the cutting groove 34 are squeezed out of the helical groove 28 and do not accumulate in the upper section of the screw 10 so that less friction is applied on the running screw 10, so that no cracks occur on the article 30, and so that reduced screwing torque is required to prevent the screw 10 from breakage because the helical groove 28 is in communication with the upper end of the cutting groove 34 and extends to the uppermost thread convolution 24 of the thread 14.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A screw comprising:
   a shank including an outer circumference, an insertion tip, and a head end spaced from the insertion tip along a longitudinal axis of the screw;
   a thread helically formed on the outer circumference of the shank and including a plurality of thread convolutions extending to an uppermost thread convolution adjacent the head and from a nethermost thread convolution adjacent the insertion tip;
   a plurality of ribs provided between two adjacent thread convolutions of the thread and spaced from one another on the outer circumference of the shank, with the plurality of ribs extending to the uppermost thread convolution from the nethermost thread convolution of the plurality of thread convolutions;
   a helical, groove formed in the outer circumference of the shank and extending continuously through at least partial of the plurality of thread convolutions of the thread, with the helical groove intersecting partial of the plurality of ribs and having a width which is 1.5-2.5 times greater than a width of each rib; and
   a cutting groove extending from the insertion tip of the shank toward but spaced from the uppermost thread convolution to an upper end spaced from the insertion tip, with the cutting groove extending through some of the plurality of thread convolutions, with the helical groove spirally extending from the upper end of the cutting groove to the uppermost thread convolution of the thread continuously, wherein an inclined angle formed by the helical groove extending toward the head end relative to a horizontal axis perpendicular to the longitudinal axis is greater than an inclined angle formed by the thread extending toward the head end relative to the horizontal axis, with a width of the cutting groove at an interconnection with the helical groove being greater than a width of the helical groove at the interconnection.

2. The screw according to in claim 1, wherein the helical groove extends to the uppermost thread convolution of the thread from the nethermost thread convolution of the thread continuously, wherein an inclined angle formed by the helical groove extending toward the head end relative to a horizontal axis perpendicular to the longitudinal axis is greater than an inclined angle formed by the thread extending toward the head end relative to the horizontal axis.

3. The screw according to claim 2, wherein an inclined angle formed by each of the plurality of ribs extending toward the head end relative to the horizontal axis is between 50 and 70 degrees, with the inclined angle formed by the helical groove relative to the horizontal axis being between 60 and 80 degrees.

4. The screw according to claim 1, wherein an inclined angle formed by each of the plurality of ribs extending toward the head end relative to the horizontal axis is between 50 and 70 degrees, with the inclined angle formed by the helical groove relative to the horizontal axis being between 60 and 80 degrees.

5. The screw according to claim 1, wherein an upward extending direction of each of the plurality of ribs is opposite to an upward direction of the thread extending toward the head end, with each of the plurality of ribs having a rectangular cross section with a height less than a thread height of each thread convolution, with an upward spiral direction of the helical groove being the same as the upward direction of the thread extending toward the head end, with the helical groove having a depth which is 1.5-2.5 times greater than the height of each rib.

6. A screw comprising:
a shank including an outer circumference, an insertion tip, and a head end spaced from the insertion tip along a longitudinal axis of the screw;
a thread helically formed on the outer circumference of the shank and including a plurality of thread convolutions extending to an uppermost thread convolution adjacent the head and from a nethermost thread convolution adjacent the insertion tip;
a plurality of ribs provided between two adjacent thread convolutions of the thread and spaced from one another on the outer circumference of the shank, with the plurality of ribs extending to the uppermost thread convolution from the nethermost thread convolution of the plurality of thread convolutions; and
a helical groove formed in the outer circumference of the shank and extending continuously through at least partial of the plurality of thread convolutions of the thread, with the helical groove intersecting partial of the plurality of ribs and having a width which is 1.5-2.5 times greater than a width of each rib, wherein the helical groove extends to the uppermost thread convolution of the thread from the nethermost thread convolution of the thread continuously, inclined angle formed by the helical groove extending toward the head end relative to a horizontal axis perpendicular to the longitudinal axis is greater than an inclined angle formed by the thread extending toward the head end relative to the horizontal axis, wherein an upward extending direction of each of the plurality of ribs is opposite to an upward direction of the thread extending toward the head end, with each of the plurality of ribs having a rectangular cross section with a height less than a thread height of each thread convolution, with an upward spiral direction of the helical groove being the same as the upward direction of the thread extending toward the head end, with the helical groove having a depth which is 1.5-2.5 times greater than the height of each rib.

\* \* \* \* \*